United States Patent [19]

Sayles

[11] 4,320,621
[45] Mar. 23, 1982

[54] PREVENTION OF AMMONIA FORMATION IN ROCKET MOTORS AND LASER PUMPING SYSTEMS

[75] Inventor: David C. Sayles, Huntsville, Ala.

[73] Assignee: The United States of America as represented by the Secretary of the Army, Washington, D.C.

[21] Appl. No.: 116,114

[22] Filed: Jan. 15, 1980

[51] Int. Cl.³ .................... C06D 5/00; H01S 3/00
[52] U.S. Cl. ................................ 60/214; 60/211
[58] Field of Search .................... 60/211, 212, 214; 331/94.5 G

[56] References Cited

U.S. PATENT DOCUMENTS 2,993,334 7/1961 Burton ........................ 60/212
2,994,191 8/1961 Hamilton ..................... 60/214
3,354,646 11/1967 Maya et al. .................. 60/211
4,157,270 6/1979 Martignoni et al. ........... 60/211

OTHER PUBLICATIONS

Seifert et al., *Chem. Abs.*, 69, Abs. #64188z, (1968).
Beveridge et al., *Chem. Abs.*, 68, Abs. #74687e, (1968).

*Primary Examiner*—Edward A. Miller
*Attorney, Agent, or Firm*—William G. Gapcynski; Werten F. W. Bellamy; Jack W. Voigt

[57] ABSTRACT

Disclosed is a method for the prevention of the formation of ammonia as a byproduct in the reaction of hydrazine and a halogen oxidizer used in a liquid-propelled rocket engine and in chemical laser pumping systems. The method employs vanadium pentafluoride as an additive up to about 1% to the halogen oxidizer to thereby shift the equilibrium of the reaction between the hydrazine and the halogen oxidizer so that no ammonia is produced.

5 Claims, 3 Drawing Figures

PREVENTION OF AMMONIA FORMATION IN ROCKET MOTORS AND LASER PUMPING SYSTEMS

DEDICATORY CLAUSE

The invention described herein may be manufactured, used, and licensed by or for the Government for governmental purposes without the payment to me of any royalties thereon.

BACKGROUND OF THE INVENTION

Hydrazine has been employed as rocket fuel in a liquid-propelled rocket engine and in laser systems as a fuel source. The fuel hydrazine when employed in combination with an oxidizer such as chlorine trifluoride or chlorine pentafluoride results in the formation of a quantity of ammonia, particularly when the system is operated in a fuel-rich mode. The ammonia, thus formed, introduces a serious problem insofar as infrared sensor functioning is concerned because of its several absorption bands in the infrared spectrum. Thus, an interference in rocketry as well as laser system is present when ammonia is present. The laser pumping as well as the efficiency of the stimulated emission of the chemical laser system is adversely effected by ammonia.

An approach to reducing the problems associated with ammonia includes the use of a properly designed catalyst bed to reduce the quantity of ammonia formed as a byproduct. This approach does not ameliorate the problem to a permissible level. Another corrective approach relates to operating the rocket engine at a higher operating temperature—a temperature at which ammonia would be decomposed as soon as it is formed, but this condition is very difficult to achieve, and the higher temperature adversely affects the life cycle of the rocket engine.

Advantageous would be a solution to the ammonia problem which involves the use of a reactive additive to the halogen oxidizer which shifts the equilibrium of the reaction between the hydrazine and the halogen oxidizer so that no ammonia is produced.

Therefore an object of this invention is to provide a method for the prevention of the formation of ammonia as a byproduct in the reaction of hydrazine and the halogen oxidizer when employed in combination with a liquid-propelled rocket engine.

Another object of this invention is to provide a method for the prevention of the formation of ammonia as a byproduct in the reaction of hydrazine and the halogen oxidizer when employed in combination with a chemical laser pumping system.

SUMMARY OF THE INVENTION

A reactive additive of vanadium pentafluoride to chlorine trifluoride or chlorine pentafluoride is effective in preventing the formation of ammonia as a byproduct in the reaction of hydrazine and the halogen oxidizer.

Percentages of vanadium pentafluoride in the range of about 1 weight percent is adequate to achieve the elimination of the formation of ammonia. The employment of vanadium pentafluoride as an additive to the halogen oxidizer shifts the equilibrium of the reaction between the hydrazine and the halogen oxidizer so that no ammonia is produced.

DESCRIPTION OF THE PREFERRED EMBODIMENT

Figure 1:
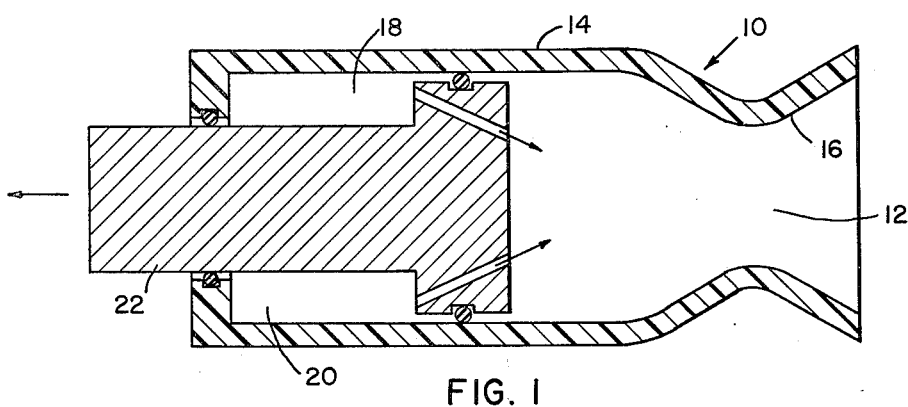
FIG. 1 is a schematic of a reaction control thruster employed as a test device.

Vanadium pentafluoride in an amount of about 1 weight percent when added to the halogen oxidizer is effective in shifting the equilibrium of the reaction between hydrazine and the halogen oxidizer (e.g., chlorine trifluoride or chlorine pentafluoride). This shifting of the equilibrium results in no formation of the undesirable product ammonia when the reaction is employed in combination with a liquid-propelled rocket engine system or when the reaction is employed in combination with a chemical laser system which employs a chemical laser pumping system. Specific advantages of employing the vanadium pentafluoride as catalyst are ciited below.

The employment of such a catalyst as an additive would (1) permit the use of a wide range of fuel-oxidizer mixture ratios, (2) permit the operation of the catalyst bed at a minimum temperature, and insure its increased life expectancy, (3) permit the operation of the rocket engine so that it can be operated under fuel-rich conditions, and reduce the damage resulting from the corrosivity of the propellants, and (4) eliminate the interference in the chemical laser pumping of the transmission of the stimulated emission.

In further reference to the drawing, the Figures of the drawing relate to ammonia testing for ammonia reduction, favored conditions for ammonia formation, and a depiction of how the reaction control thrusters (which employ ammonia forming fuel and oxidizer compounds) are positioned on a missile. A more detailed explanation of these Figures are set forth below along with details of the testing for ammonia and test results obtained.

FIG. 1 consists of a schematic of a reaction control thruster 10 which was used as the test device. The control thruster comprises a combustion chamber 12 defined by a motor case 14 with an associated exhaust nozzle 16. Positioned within the thruster device is a fuel tank 18 and an oxidizer tank 20 whose contents are injected by a piston 22 into the combustion chamber 12. It is positioned at the center of the test chamber. The latter could be evacuated to simulate an exoatmospheric environment. When the position of the piston is moved forwards, hydrazine and chlorine pentafluoride are injected through their orifices into the combustion chamber.

Figure 2:
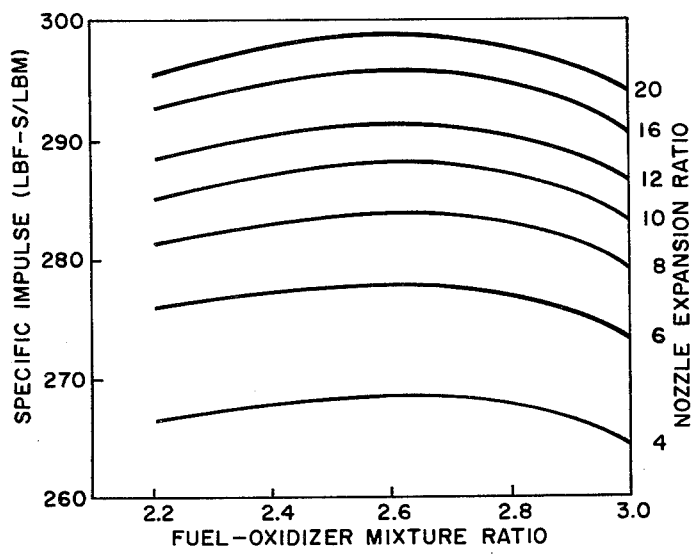
FIG. 2 is a graph which depicts the relationship among specific impulse, fuel-oxidizer mixture ratio, and nozzle expansion as related to ammonia formation.

FIG. 2 depicts the relationship among specific impulse, fuel-oxidizer ($N_2H_4$—$ClF_5$) mixture ratio and nozzle expansion ratio. For this investigation the reaction was carried out at a high fuel-oxidizer ratio (3.0) because, such a ratio, would be conducive to the formation of a higher content of ammonia in the exhaust. Operating at this fuel-oxidizer ratio, analysis of the near-field gasdynamics of this test thruster, when operated in the test chamber (8 feet diameter, 16 feet high), at simulated exoatmospheric conditions, showed an ammonia content of 28% in the exhaust, whereas, if 1% vanadium pentafluoride were contained in the chlorine pentafluoride, no measurable quantities of ammonia were detected in the exhaust.

Figure 3:
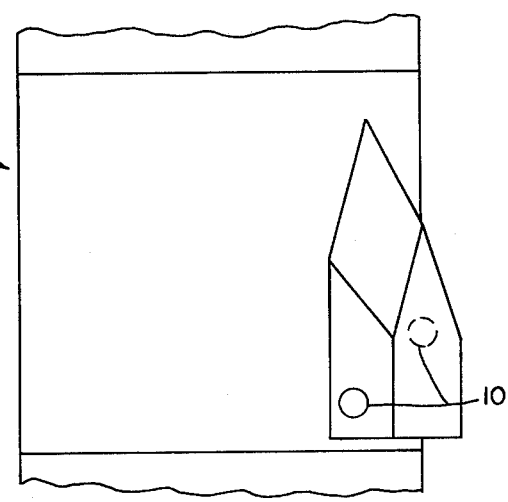
FIG. 3 depicts how reaction control thrusters are usually positioned on a missle.

FIG. 3 depicts how reaction control thrusters 10 are usually positioned on a misile 30.

The thruster characteristics employed for testing in accordance with this invention are listed in Table 1 below.

TABLE 1

| | |
|---|---|
| Throat Diameter (in.) | 0.707 |
| Chamber Volume (cu. in.) | 8 |
| Piston Stroke (in.) | 0.85 |
| Piston Face Area (sq. in.) | 4.15 |
| Fuel Orifice Area (sq. in.) | 0.0147 |
| Oxidizer Orifice Area (sq. in.) | 0.0171 |
| Maximum Chamber Pressure (psia) | 4400 |
| Maximum Thrust (lb.) | 2830 |
| Burning Time (ms.) | 13 |
| Total Impulse/pulse (lb.-s) | 17.8 |

Area or Piston Face on Propellant Side = 5 sq. in.
Area of Piston Face on Combustion Chamber Side = 10 sq. in.

The following is a general description of the long-wave infrared diagnostic optical system that was used in assessing the reduction in the ammonia content of the exhaust plume of the test thruster (FIG. 1). The optical diagnostic instrumentation consisted of scanning spectrometers and radiometers of selected wavelengths. These optical instruments were situated on opposite sides of the test chamber diameter so that each served as a cold background for the other. In this manner, any degradation from the ideal 70° K.liquid nitrogen optics and background resulted only from stray light from the room temperature test chamber walls. The detectors were focussed onto the plume axis, and a rotating circular variable filter was used to obtain the spectral scan. Each circular variable filter consisted of a one-piece substrate disc, which, in one revolution scanned from 6 to 12 to 6 μm and from 12 to 24 to 12 μm, respectively. Appropriate germanium-mercury and silicon-arsenic detectors were used. The rate of spin of the circular variable filters were 3600 rpm, and, hence, a spectrum was obtained every 8 milliseconds. (Ammonia emits at 18.5 micron band.)

The reactions of hydrazine and halogen oxidizers are well known both in the rocketry and laser arts. The disadvantages and problems associated with the byproduct ammonia have been recognized as a continuing problem.

For instance, ammonia is an undesirable constituent in the exhaust products of any liquid bipropellant system in which hydrazine is the fuel. Ammonia is formed by decomposition of hydrazine when the combustion operates at high temperatures. The formation of ammonia interferes with the performance of the detectors. Since most detection is limited to the atmospheric windows, the propellant's exhaust products must not emit light which might mask out any objects behind or absorb light from these objects. This limits the exhaust products of those species which are already present in the environment, or, at least, to those whose infrared emission is at the same wavelength as those species which are already present in the environment. Ammonia is the principal exhaust product not meeting these requirements. There is an additional bonus that results from the elimination of ammonia from the exhaust products, namely, the specific impulse produced by the reaction of chlorine pentafluoride and hydrazine is higher than when ammonia is one of the products.

Thus, the shifting of the equilibrium of the reaction between hydrazine and halogen oxidizers in accordance with this invention so that no ammonia is produced will provide many advantages and benefits to the systems where used. Other advantages and benefits in addition to those set forth above, should be recognized by those skilled in the rocketry and laser arts.

I claim:

1. A method for the prevention of the formation of ammonia as a byproduct in the reaction of hydrazine and a halogen oxidizer when used in liquid-propelled rocket engine system or in a chemical laser pumping system, said method comprising the steps of:
   (i) providing a predetermined quantity of a halogen oxidizer selected from the halogen oxidizers consisting of chlorine trifluoride and chlorine pentafluoride to be reacted with hydrazine;
   (ii) incorporating an effective amount of vanadium pentafluoride into said halogen oxidizer, said effective amount of said vanadium pentafluoride being about 1% by weight of said predetermined quantity of said halogen oxidizer, and said effective amount being adequate to shift the equilibrium of the reaction between said hydrazine and said halogen oxidizer so that no ammonia is produced; and
   (iii) reacting said halogen oxidizer containing said vanadium pentafluoride with hydrazine to yield reaction products free from ammonia.

2. The method of claim 1 wherein said halogen oxidizer provided is chlorine trifluoride and wherein said reacting is accomplished in combination with a liquid-propelled rocket engine system.

3. The method of claim 1 wherein said halogen oxidizer provided is chlorine pentafluoride and wherein said reacting is accomplished in combination with a liquid-propelled rocket engine system.

4. The method of claim 1 wherein said halogen oxidizer provided is chlorine trifluoride and wherein said reacting is accomplished in combination with a chemical laser pumping system.

5. The method of claim 1 wherein said halogen oxidizer provided is chlorine pentafluoride and wherein said reacting is accomplished in combination with a chemical laser pumping system.

* * * * *